C. J. SANDS.
Flower-Pot.
No. 167,790.
Patented Sept. 14, 1875.
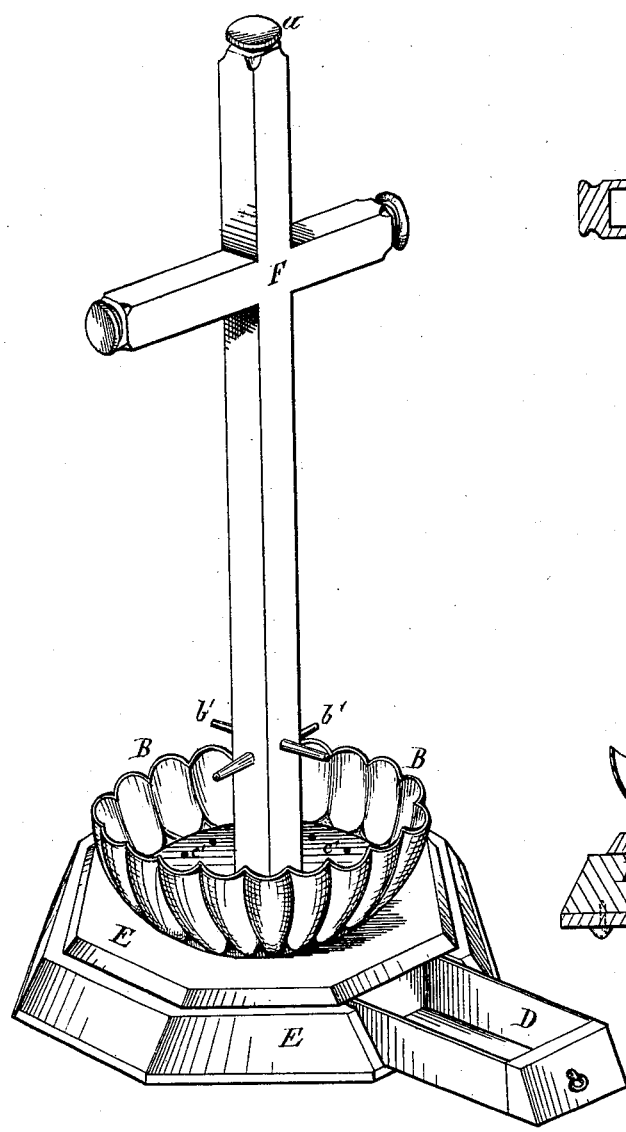
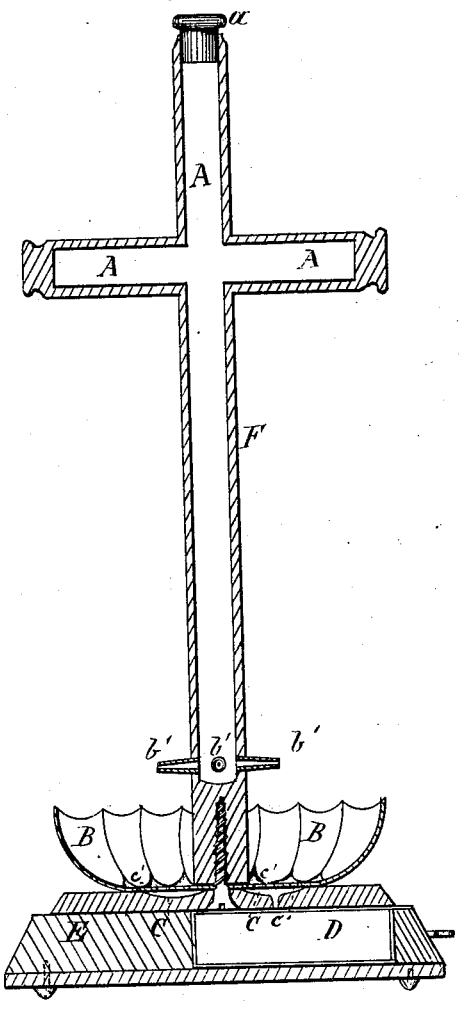
Witnesses
Henry Orth
W. A. Dangerfield
Inventor
Charles J. Sands
H. J. Kiernan
atty

UNITED STATES PATENT OFFICE.

CHARLES J. SANDS, OF BROOKLYN, NEW YORK.

IMPROVEMENT IN FLOWER-POTS.

Specification forming part of Letters Patent No. 167,790, dated September 14, 1875; application filed January 18, 1875.

*To all whom it may concern:*

Be it known that I, CHARLES J. SANDS, of Brooklyn, in the county of Kings and State of New York, have invented a new and Improved Flower-Pot for Plants, having a reservoir for water, and a drain attached, as shown in the accompanying drawing.

By reference to Figure 2 of the drawing it will be seen that water is put into the reservoir A by removing the stopper $a$ at the top, from which it is supplied in small quantities (in drops) above the surface of the soil in the pot B by means of the small tubes or spouts $b'$. The water is drained off from the soil by small holes cut in the bottom of the pot B, falling into the drain-gutter C, and from thence through one hole at $c'$ into the drain cup or pan D. The drain-gutter C is cut in the top of the stand or base-block E, in a circle, and covered by the bottom of the pot B. The drain-cup D is fitted into the stand E, and can be drawn out and emptied without disturbing the position of the flower-pot, and, when closed, will be out of sight, forming part of the stand. The reservoir A is fitted into the support or trellis F, made in the form of a cross or other design, forming a support for flowers and vines.

It will be understood that the stand, support, and flower-pot may be made of any suitable material, such as wood, iron, tin, &c., and the flower-pot may be made of burnt clay or other porous material.

Having thus described my invention, what I claim as new, and desire to secure by Letters Patent, is—

1. In combination with a flower-pot, B, a hollow support or standard, F, for the support of plants or vines, forming a water-reservoir, A, as shown, and provided with a stopper, $a$, or its equivalent, and the sprinkling tubes or spouts $b'$, substantially as and for the purposes specified.

2. The combination of a flower-pot, B, hollow support or standard F, forming water-reservoir A, the sprinkling tubes or spouts $b'$, with a stand or base, E, having a circular groove or gutter, C, formed therein, the orifice $c'$, and a drain-cup, D, all arranged substantially as shown, and for the purposes described.

Signed by me this 15th day of January, A. D. 1875.

CHAS. J. SANDS.

Witnesses:
    JOS. T. SANDS,
    LEVI COOK, Jr.